US009587859B1

(12) United States Patent
Port

(10) Patent No.: US 9,587,859 B1
(45) Date of Patent: Mar. 7, 2017

(54) STRAP MOUNT FOR SOLAR PANELS

(71) Applicant: Jonathan Port, Los Angeles, CA (US)

(72) Inventor: Jonathan Port, Los Angeles, CA (US)

( * ) Notice: Subject to any disclaimer, the term of this patent is extended or adjusted under 35 U.S.C. 154(b) by 0 days.

(21) Appl. No.: 14/489,314

(22) Filed: Sep. 17, 2014

Related U.S. Application Data

(62) Division of application No. 13/038,286, filed on Mar. 1, 2011, now Pat. No. 8,870,139.

(51) Int. Cl.
*E04D 13/18* (2014.01)
*F24J 2/52* (2006.01)

(52) U.S. Cl.
CPC ............ *F24J 2/5241* (2013.01); *F24J 2/5245* (2013.01); *F24J 2/5252* (2013.01); *F24J 2/5262* (2013.01); *F24J 2002/5281* (2013.01)

(58) Field of Classification Search
CPC .. F24J 2/5241; F24J 2/52; F24J 2/5245; F24J 2/5252; F24J 2/5262; F24J 2002/5281; H02S 20/24; H02S 20/00
USPC ........... 248/148, 201, 220.21, 229.17, 228.8, 248/230.8, 499, 500, 200, 505, 154, 248/346.01, 146, 237; 211/41.1; 410/97–98; 136/251, 259; 52/173.3
See application file for complete search history.

(56) References Cited

U.S. PATENT DOCUMENTS

| | | | |
|---|---|---|---|
| 1,732,973 A | 10/1929 | Krumholz | |
| 3,882,651 A | 5/1975 | Gilchrist | |
| 5,409,549 A | 4/1995 | Mori | |
| 6,065,255 A | 5/2000 | Stern et al. | |
| 6,495,750 B1 | 12/2002 | Dinwoodie | |
| 7,307,209 B2 * | 12/2007 | Mapes et al. | 136/251 |
| 7,806,377 B2 | 10/2010 | Strizki | |
| 8,281,524 B2 | 10/2012 | Hund | |
| 8,453,986 B2 * | 6/2013 | Schnitzer | 248/237 |
| 8,590,224 B2 | 11/2013 | Rummens | |
| 2006/0266352 A1 | 11/2006 | Marston et al. | |
| 2009/0250580 A1* | 10/2009 | Strizki | 248/309.1 |
| 2009/0302183 A1 | 12/2009 | Strizki | |
| 2010/0147359 A1 | 6/2010 | Harberts et al. | |
| 2010/0193012 A1 | 8/2010 | Klammer | |
| 2010/0243023 A1 | 9/2010 | Patton et al. | |
| 2010/0313501 A1 | 12/2010 | Gangemi | |
| 2010/0313506 A1 | 12/2010 | Schoell | |
| 2011/0023390 A1* | 2/2011 | Kneip et al. | 52/173.3 |
| 2011/0138711 A1 | 6/2011 | Seng | |

(Continued)

FOREIGN PATENT DOCUMENTS

EP 0879924 A1 11/1998
WO 20140123547 A1 8/2014

*Primary Examiner* — Ingrid M Weinhold
(74) *Attorney, Agent, or Firm* — Norton R. Townsley; Belasco, Jacobs & Townsley, LLP

(57) ABSTRACT

A novel solar panel mounting system including a strap and one or more supports, having top flanges, attached to each other. The strap is attached between a first point and a second point on a surface. The support is designed to support a solar panel on this surface. The top flange of the support may be parallel to or at an angle to the surface. The strap may be singular or comprised of two straps one above the other. The strap may be attached to the top flange or the bottom or both. The supports may have any cross sectional shape. The strap may be attached to the support at its end or at a distance from the end; or normal to the support or at an angle to it. The length of the support is greater than the width of the strap.

14 Claims, 23 Drawing Sheets

(56) References Cited

U.S. PATENT DOCUMENTS

| | | |
|---|---|---|
| 2011/0197418 A1* | 8/2011 | Overturf et al. ............... 29/428 |
| 2011/0197944 A1 | 8/2011 | Hund |
| 2011/0203639 A1 | 8/2011 | Elliott et al. |
| 2011/0314751 A1 | 12/2011 | Jette |
| 2012/0186632 A1* | 7/2012 | Reinhold et al. ............ 136/251 |
| 2012/0285515 A1 | 11/2012 | Sagayama |
| 2013/0000219 A1 | 1/2013 | Kudav |
| 2013/0112248 A1 | 5/2013 | McPheeters |
| 2014/0041321 A1 | 2/2014 | Poivet |

* cited by examiner

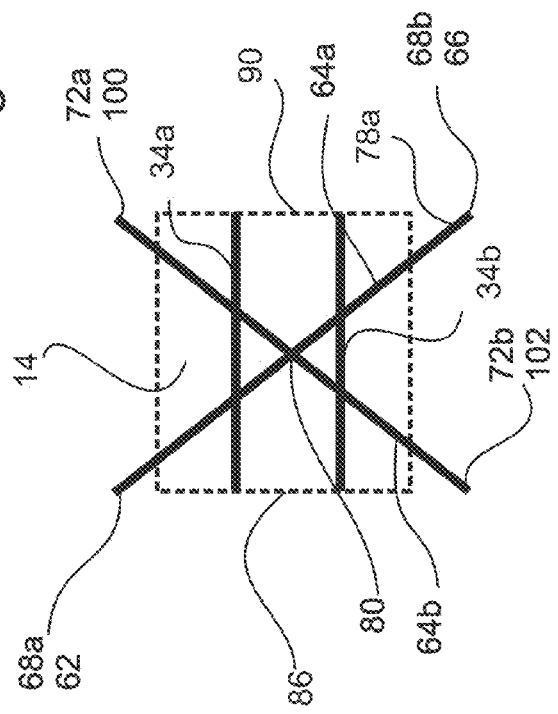
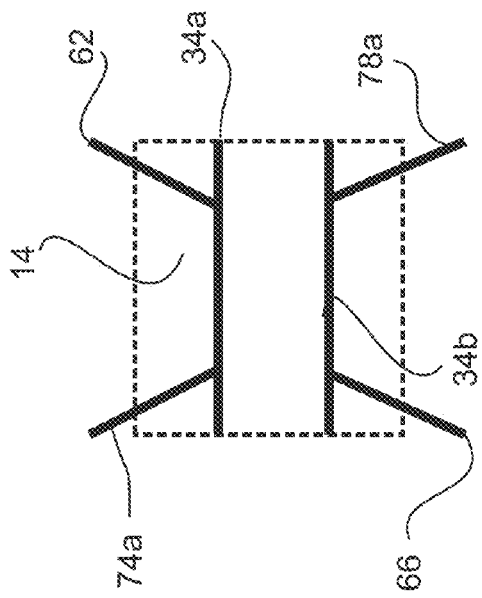

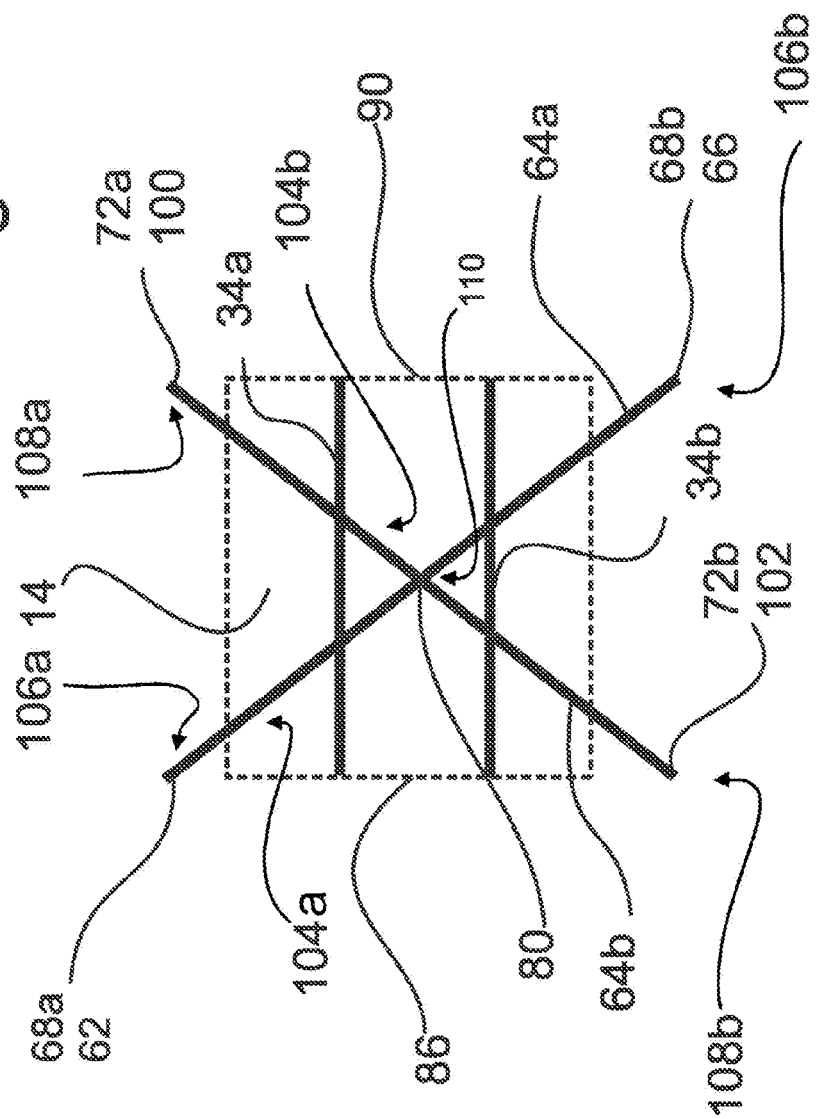

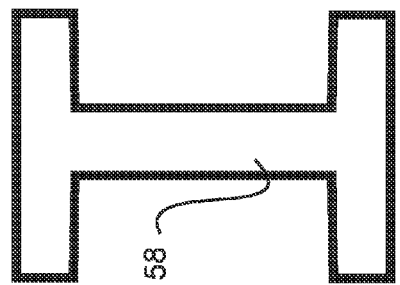
Figure 15B
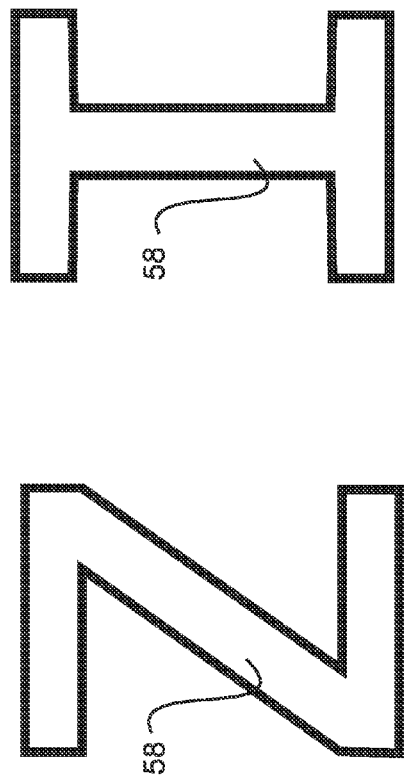
Figure 15E
Figure 15D
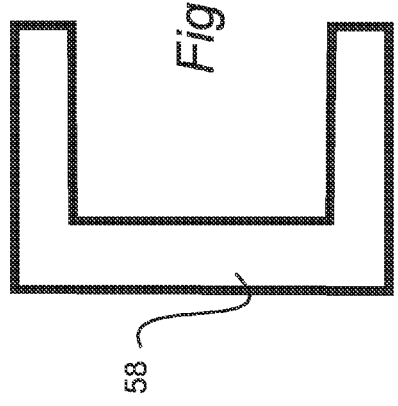
Figure 15A
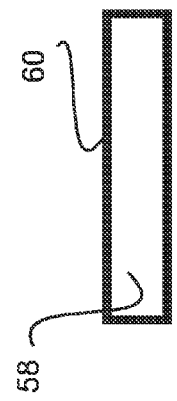
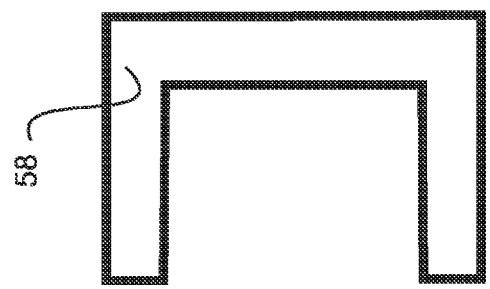
Figure 15C

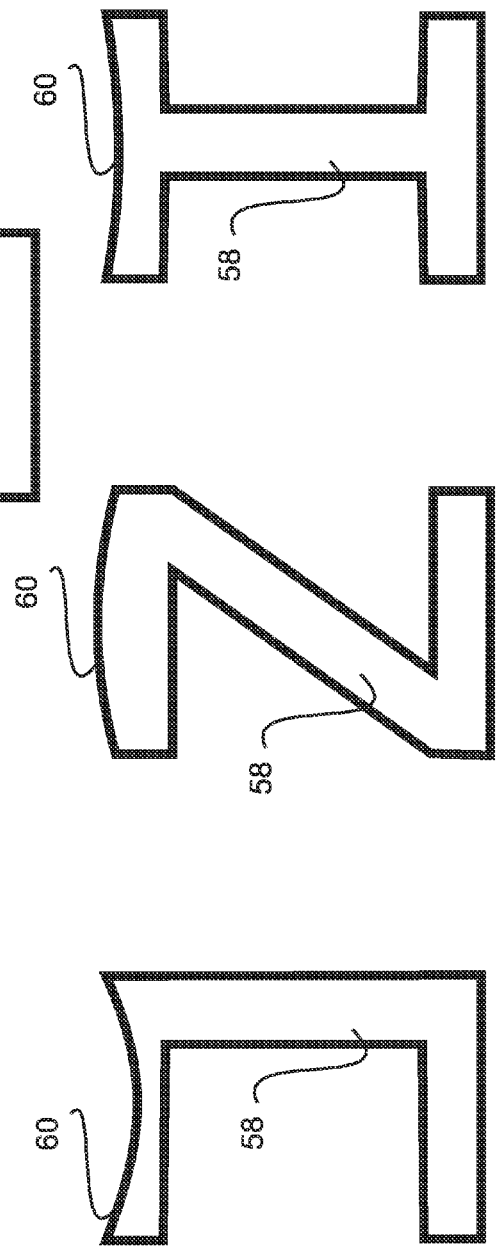
Figure 16A
Figure 16B
Figure 16C
Figure 16D
Figure 16E

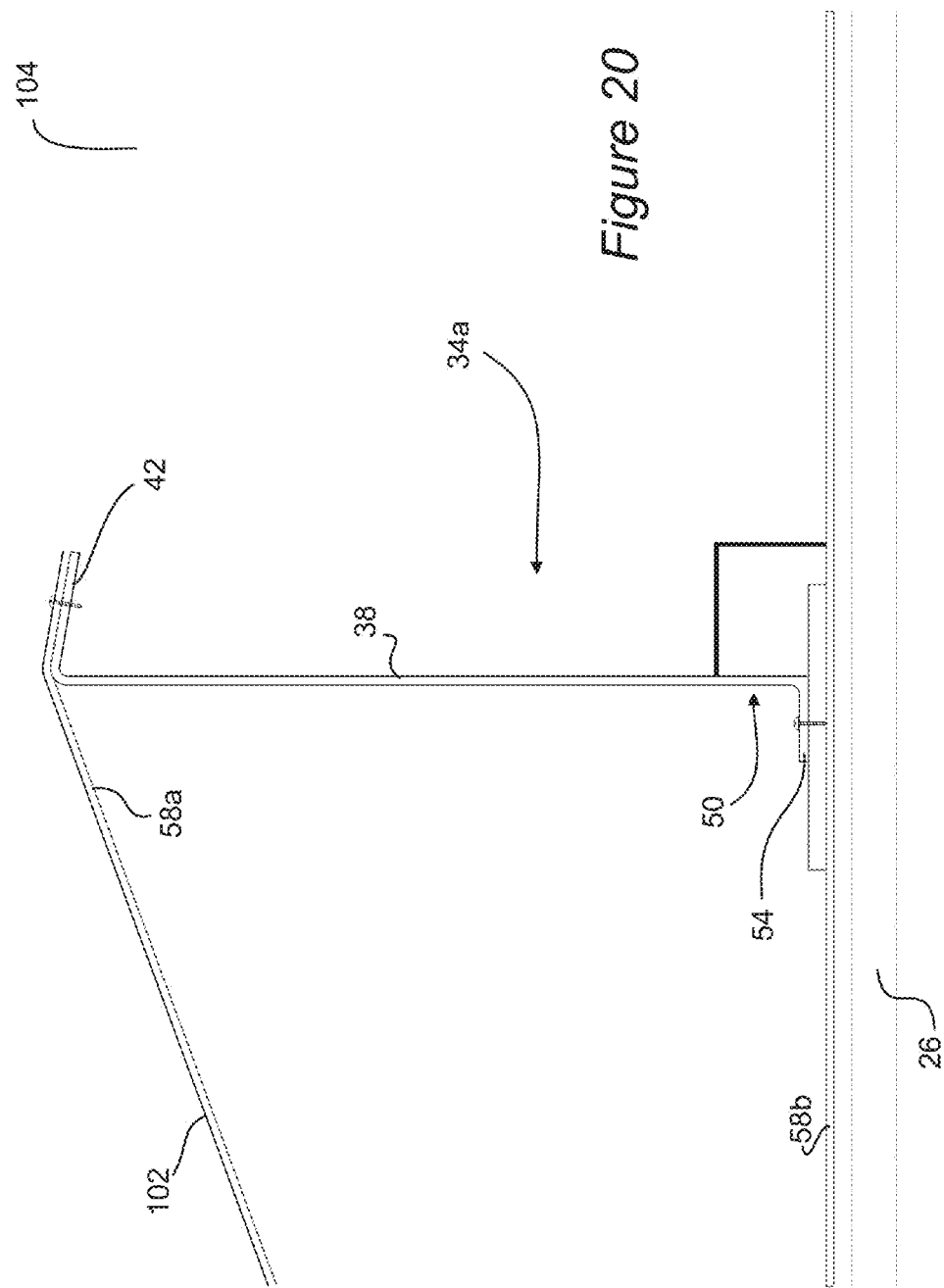

STRAP MOUNT FOR SOLAR PANELS

CROSS REFERENCE TO RELATED APPLICATIONS

This Application is a divisional of U.S. patent application Ser. No. 13/038,286, now allowed, the entire specification, claims and drawings of which are hereby incorporated into this Application by reference.

BACKGROUND OF THE INVENTION (1) Field of the Invention

The present invention relates to the field of solar panels and more particularly to apparatuses and methods for mounting solar panels on surfaces, including roofs, walls and the ground.

(2) Description of the Related Art

Solar panels must be mounted correctly in order to maximize power production and prevent movement of the panels from the force of wind. The proper solar panel mounting provides stability and the proper directional and latitudinal orientation for the solar array.

Different mounting systems are available depending on whether the modules will be mounted on a roof, a wall, the ground, or a pole. For mounting on a roof or the ground there are ballast mounts, flush mounts (such as Modular Iron-Ridge XRS available from IronRidge in Willits, Calif.) standing seams mounts, and adjustable mounts (such as those available from Unirac in Albuquerque, N. Mex.). These usually include a tilted rack, firmly attached to the substrate surface, on which the modules are firmly mounted; or brackets of at least two different heights, firmly attached to the substrate surface, to which the ends of the modules are firmly attached.

Such systems are heavy and expensive to fabricated and time consuming to install. What is needed is a mounting system which is cheaper to fabricate and less time consuming to install. Preferably the improved system can be easily fabricated on site or provided as a kit.

Development of a solar panel mounting system which is cheaper to fabricate and less time consuming to install represents a great improvement in the field of solar panel mounting and satisfies a long felt need of the solar panel installer and owner.

SUMMARY OF THE INVENTION

The present invention is a novel solar panel mounting system. It includes a strap and a support attached to each other. The strap is attached between a first point on a surface and a second point on a surface. The points are spaced apart from each other. The support is designed to support a solar panel on the surface, between the upper and lower sides of the solar panel. The support has a top flange, a bottom and an end.

The mounting system may be fabricated on site or provided as a kit. First the strap and support are fabricated. Then the strap is attached to the surface and the support is attached to the strap.

The top flange may be parallel to the surface or at an angle to the surface. The strap may be attached to the top flange or the bottom. Alternatively the strap may comprise a first strap above a second strap. In this case the first strap is attached to the top flange and the seconds strap is attached to the bottom. In addition the support may comprise a first support and a second support spaced apart from each other.

The supports may have any cross sectional shape, including, Z, C, Π, inverted Π, inverted T, and I. The strap may be attached to the support at its end or at a distance from the end. The strap may be attached to the support normal to the support or at an angle to it. The length of the support is greater than the width of the strap. The cross section of the strap may be rectangular or have any shape such as a C, Z or I. In addition, the top surface of the strap may be curved up or down.

This invention, therefore, is a solar panel mounting system which is cheaper to fabricate and less time consuming to install. The advantages of this invention installation are decreasing the number of attachment points, transfer of loads by use of the straps or cables, and faster installation with fewer parts. This invention provides less wind resistance and uplift. This improved system can be easily fabricated on site or provided as a kit.

An appreciation of the other aims and objectives of the present invention and an understanding of it may be achieved by referring to the accompanying drawings and description of a preferred embodiment.

BRIEF DESCRIPTION OF THE DRAWINGS

FIG. 9C is a sketch from the top of this invention illustrating yet another variation in attachment of the top support.

FIG. 9D is a sketch from the top of this invention illustrating yet another variation in attachment of the top support.

FIG. 9F is a sketch from the top of this invention illustrating yet another variation in attachment of the top support, having top and bottom straps.

The supports in FIGS. 1-12 are all zig-zag shaped.

FIG. 13A illustrates a support with a C shape.

FIG. 13B illustrates a support with an angled Π shape.

FIG. 13C illustrates a support with an inverted T shape.

FIG. 13D illustrates a support with an angled I shape.

FIG. 15A is a cross sectional view of a strap having a rectangular cross section.

FIG. 15B is a cross sectional view of a strap having a C-shaped cross section.

FIG. 15C is a cross sectional view of a strap having a reverse C-shaped cross section.

FIG. 15D is a cross sectional view of a strap having a Z-shaped cross section.

FIG. 15E is a cross sectional view of a strap having an I-shaped cross section.

FIG. 16A is a cross sectional view of a strap having a rectangular cross section and a concave top surface.

FIG. 16B is a cross sectional view of a strap having a C-shaped cross section and a concave top surface.

FIG. 16C is a cross sectional view of a strap having a reverse C-shaped cross section and a convex top surface.

FIG. 16D is a cross sectional view of a strap having a Z-shaped cross section and a concave top surface.

FIG. 16E is a cross sectional view of a strap having an I-shaped cross section and a convex top surface.

FIG. 20 is an enlarged view of the area marked 20 on FIG. 17.

DETAILED DESCRIPTION OF THE PREFERRED EMBODIMENT

Figure 1:
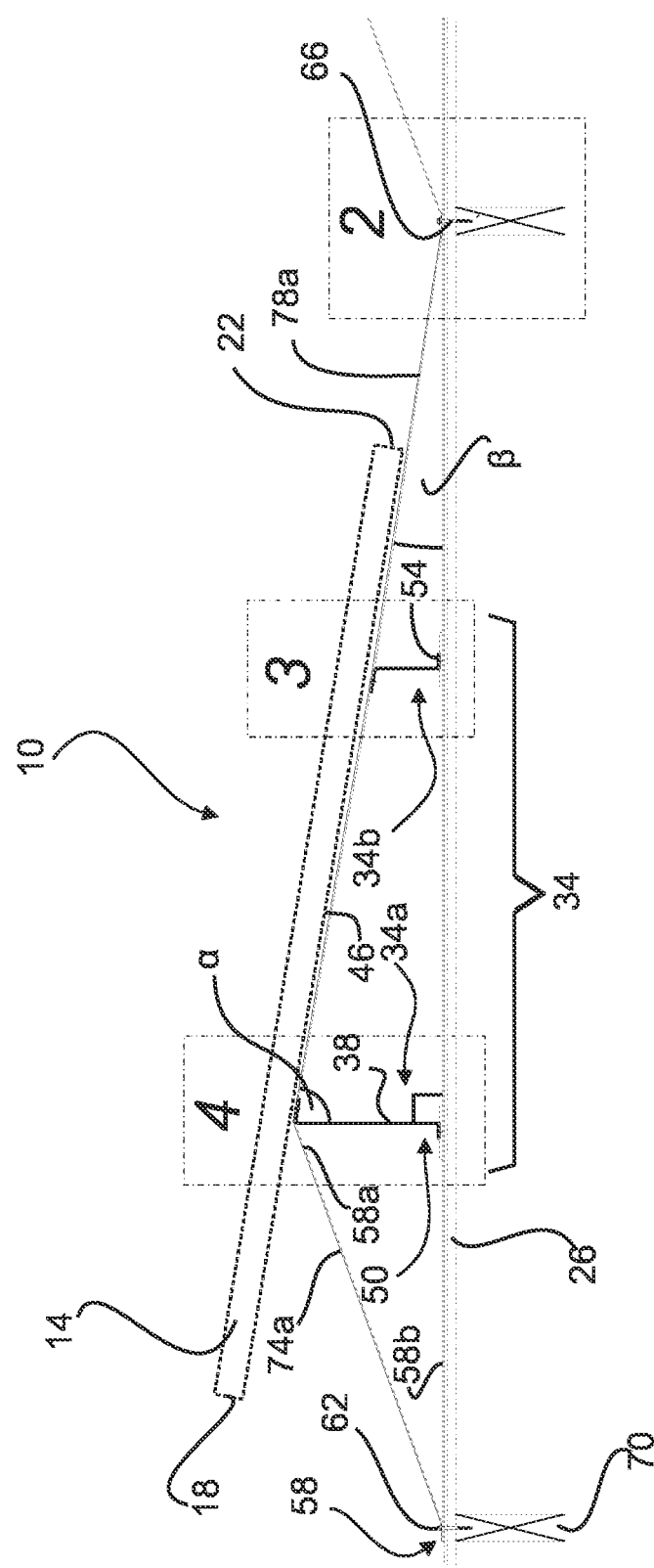
FIG. 1 is a side, cross sectional view of slightly more than one unit of one embodiment of this invention installed on a surface and supporting a solar panel. This embodiment has a top strap and a bottom strap and two supports and is attached to the surface joists.
Figure 2:
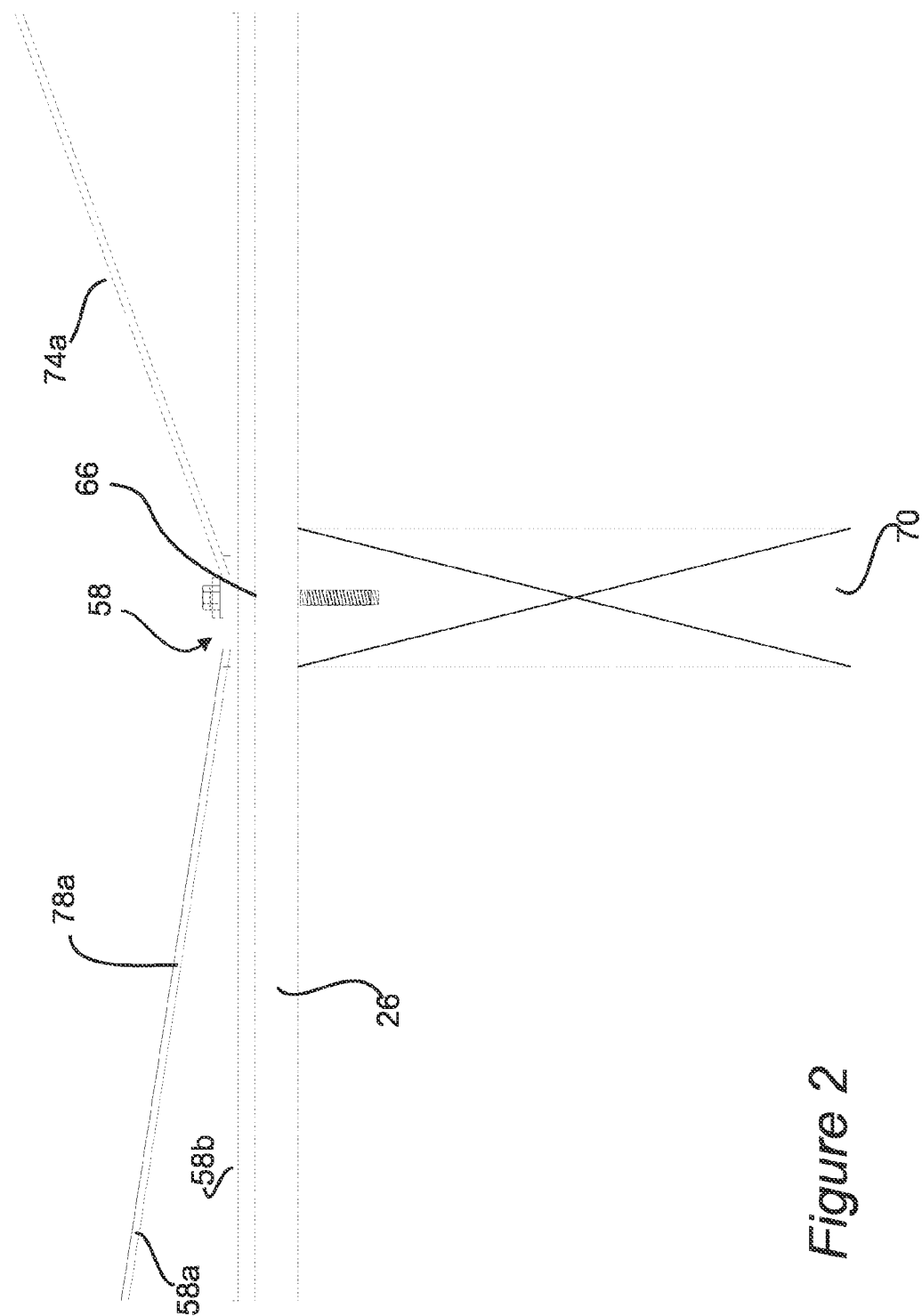
FIG. 2 is an enlarged view of the area indicated by the rectangle 2 on FIG. 1.
Figure 3:
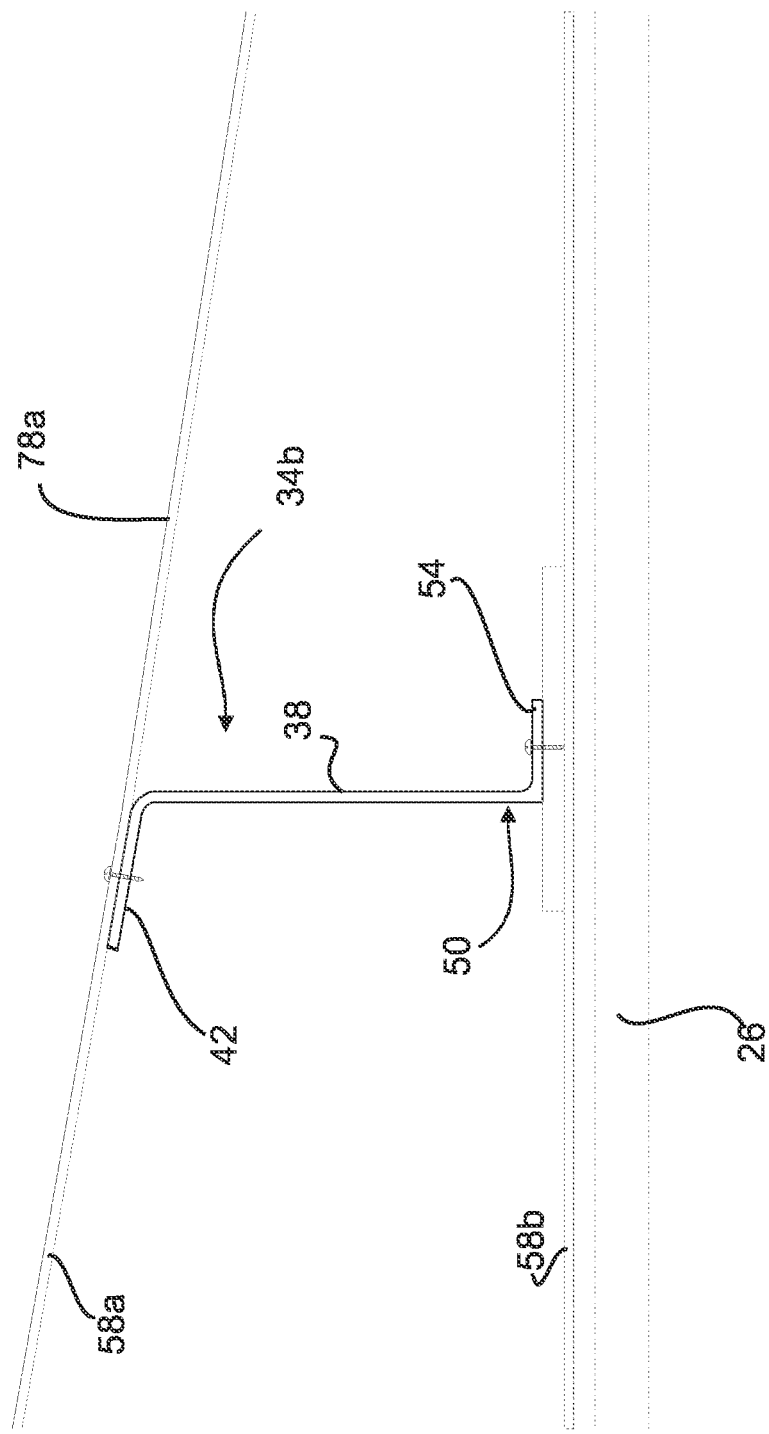
FIG. 3 is an enlarged view of the area indicated by the rectangle 3 on FIG. 1.
Figure 4:
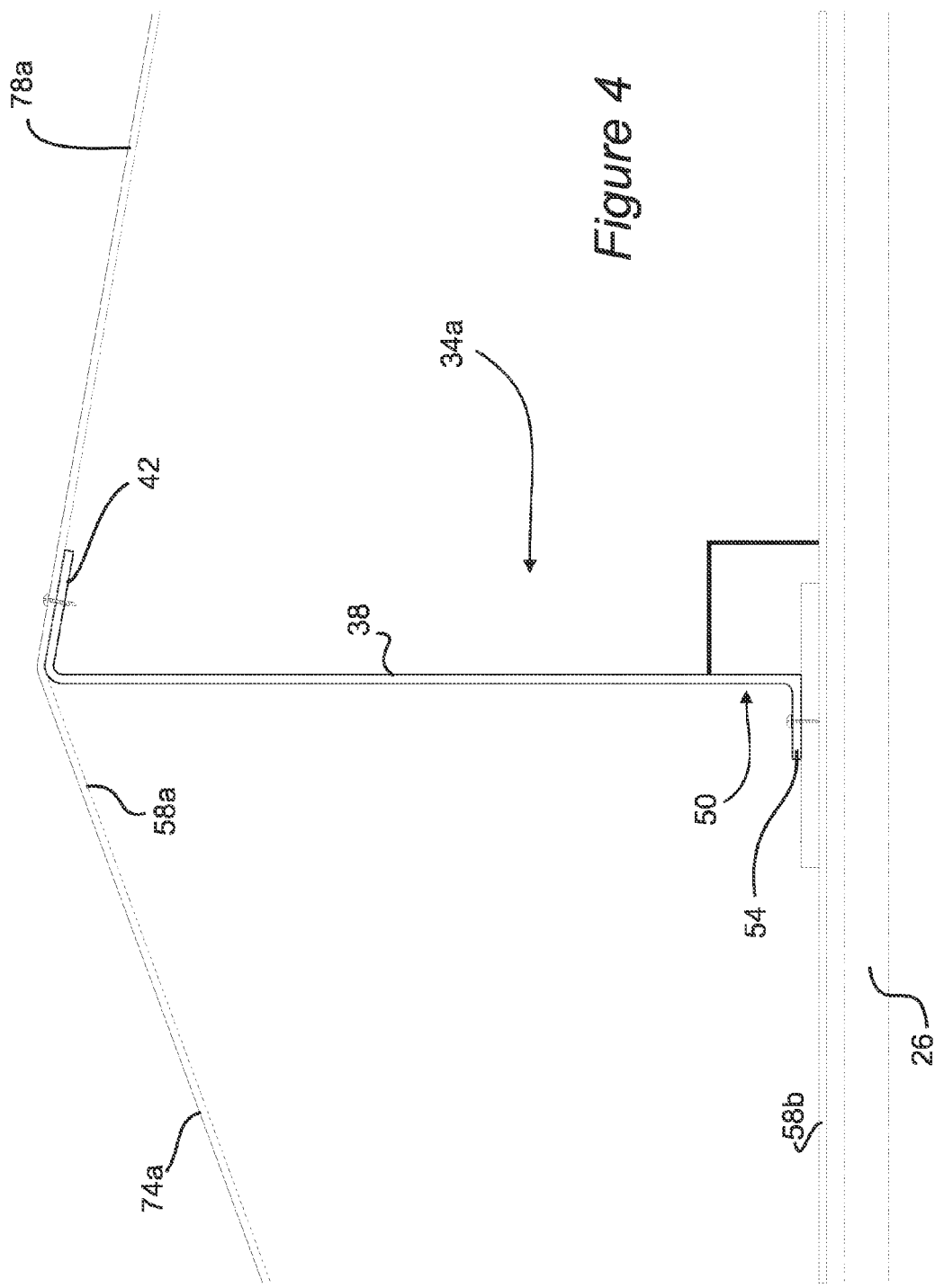
FIG. 4 is an enlarged view of the area indicated by the rectangle 4 on FIG. 1.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIGS. 1, 2, 3 and 4 illustrate the main features of this invention 10. This invention is an apparatus and method for mounting solar panels 14 on a surface. Solar panels 14 have an upper side 18 and a lower side 22. Depending on orientation, the sides 18, 22 can be the lengths or widths of the panels 14. Surfaces on which this invention can be used include roofs 26, walls and the ground 30.

The invention includes a support 34 supporting each solar panel 14 to the surface. The support 34 is located between the upper 18 and lower sides 22 of each solar panel 14. Preferably the supports 34 have at least one central member 38 and a top flange 42. The top flange 42 can be parallel to or at an angle to the surface. If angled, the angle $\alpha$ between the top flange 42 and the central member 38 is the complement of the angle $\beta$ between the surface and the bottom 46 of the solar panel 14. The angle $\beta$ is preferably 45° or less.

This invention also includes a strap 58 attached between a first point 62 and a second point 66 on the surface. The first 62 and second 66 points are spaced apart from each other on either side of the support 34. Preferably, in buildings, the invention is designed so that attachment of the strap 58 to the roof 26 or wall at the points 62, 66 is over a roof joist 70 or beam so that attachment is made through the roof 26 and into the joist 70 or through the wall and into the beam. Preferably such attachment is made by screws, bolts, or studs.

Figure 5:
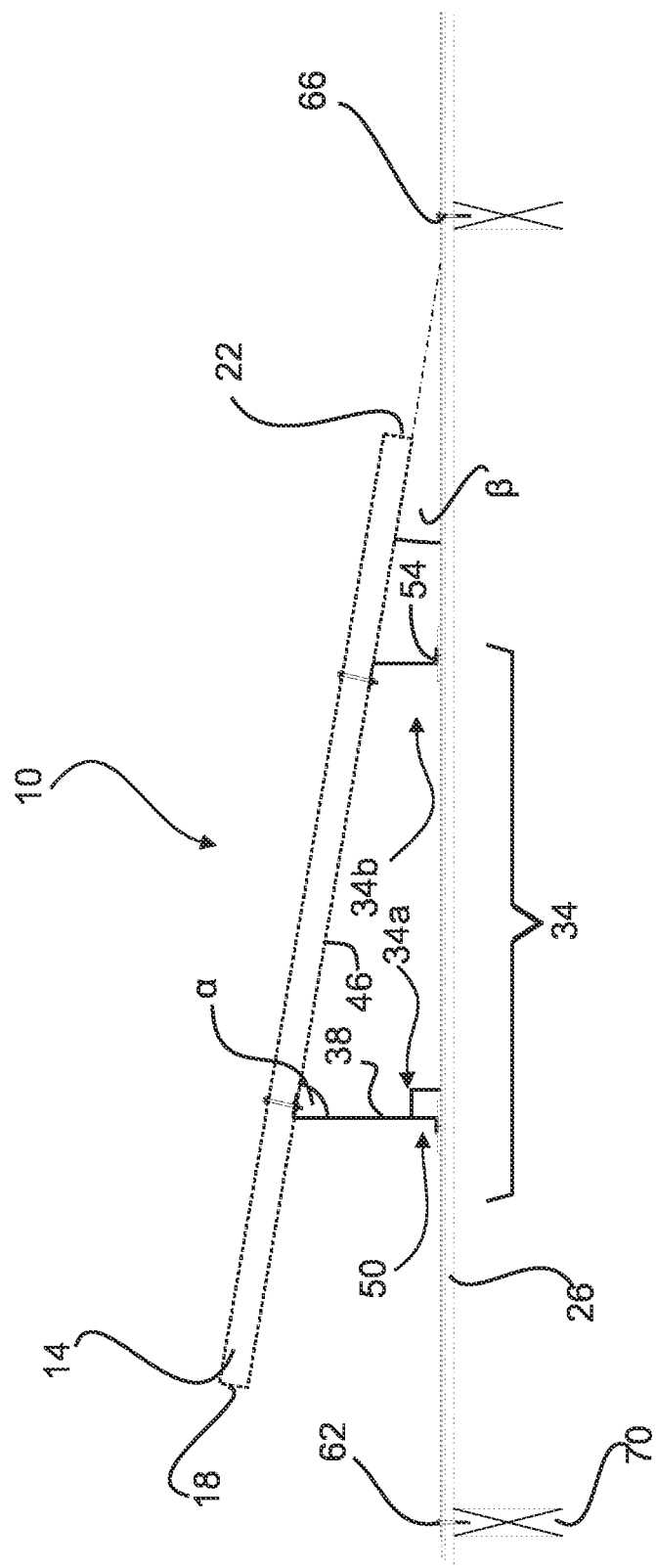
FIG. 5 is a side, cross sectional view of one unit of another embodiment of this invention. This embodiment has a bottom strap and two supports.
Figure 6:
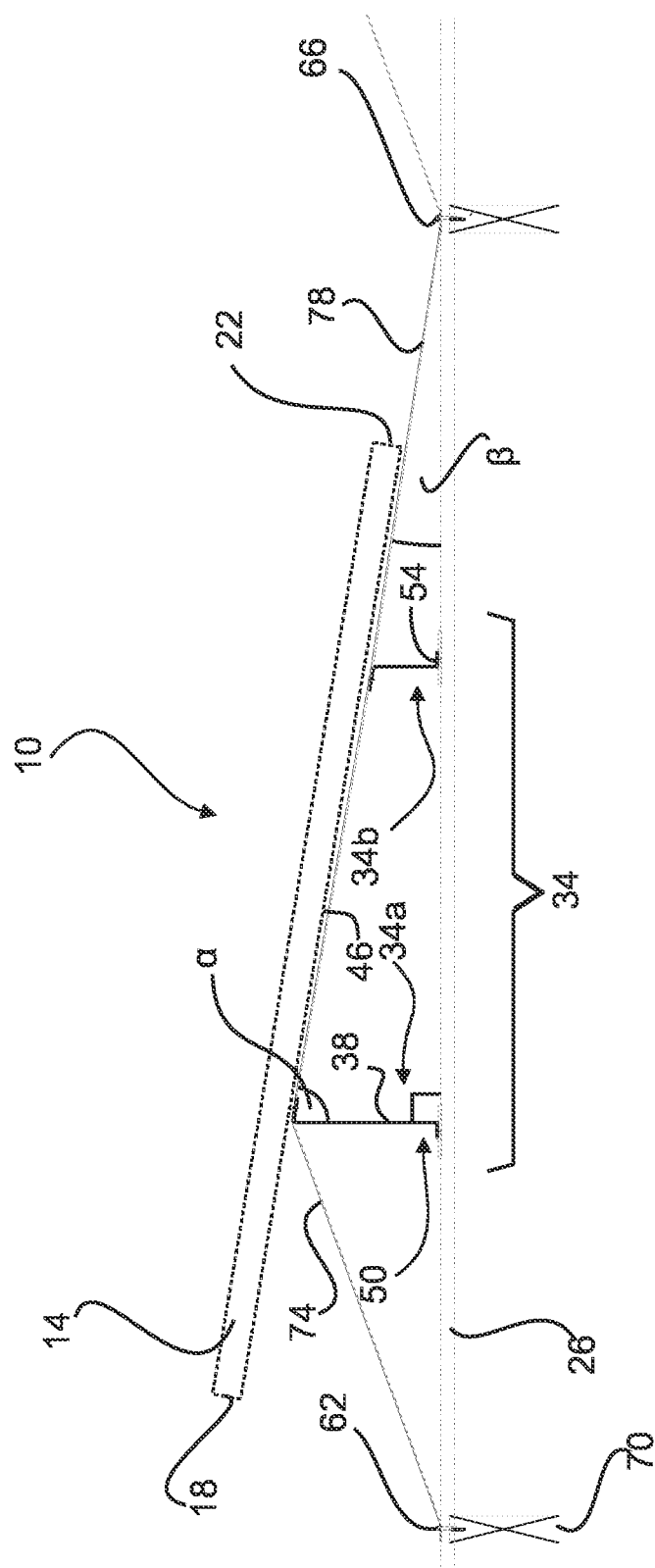
FIG. 6 is a side, cross sectional view of slightly more than one unit of yet another embodiment of this invention installed on a surface and supporting a solar panel. This embodiment has a top strap and two supports.

The strap 58 can be attached to the top flange 42, as shown in FIG. 6, or the bottom 50 of the support 34, as shown in FIG. 5. In the former case, the strap will have a steeply pitched section 74 and a gently pitched section 78. But the strap 58 can comprise a top or first strap 58a over a bottom or second strap 58b, as shown in FIGS. 1-4. In this case the top strap 58a is attached to the top flange 42 (and will have a steeply pitched section 74a and a gently pitched section 78a) and the bottom strap 58b is attached to the bottom 50 of the support 34. Attachment to the top flange 42 can be by and convenient means such as screws, bolts, studs, clamps or welding. Many different ways can be conceived of attaching the bottom 50 of each support 34 to bottom strap 58b. Perhaps, the simplest is via a bottom flange 54 attached to the central member 38. Fastening may be via screw, bolt, stud, adhesive, clamping, welding, etc. In addition, the bottom 50 of each support 34 may be attached to the surface.

The support 34 can comprise two supports, a peak support 34a and an intermediate support 34b spaced apart from each other, as shown in FIGS. 1, 3, 4, 5, 6 and 7. The supports 34a 34b can be provided with weep holes 76 to allow drainage and prevent water from collecting and stagnating. In windy areas, the supports can be provided with pressure relief holes (not illustrated) to prevent wind from blowing them off the surface.

Figure 7:
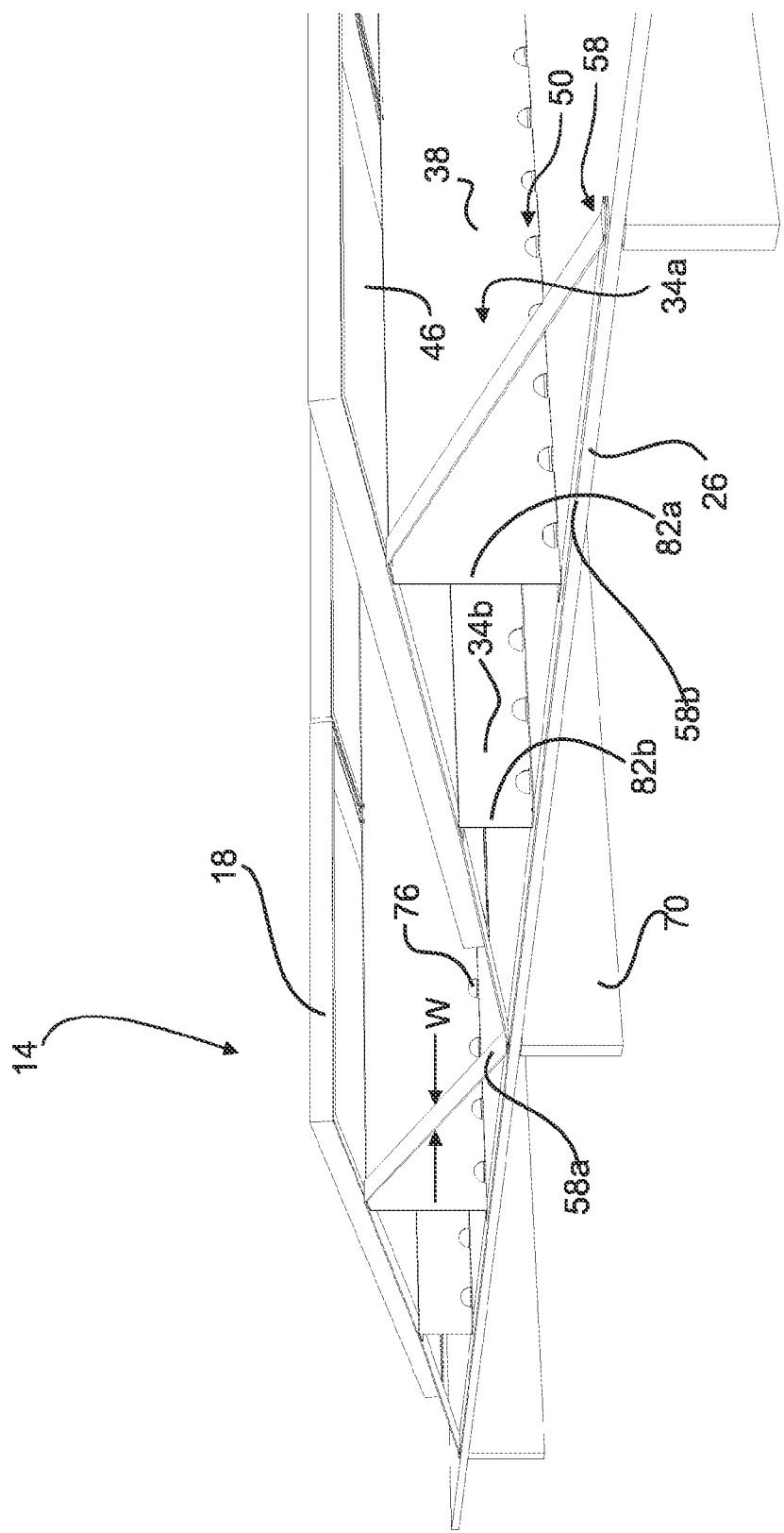
FIG. 7 is a perspective view of an embodiment of this invention installed on a surface for support of a solar panel array from one angle.
Figure 8:
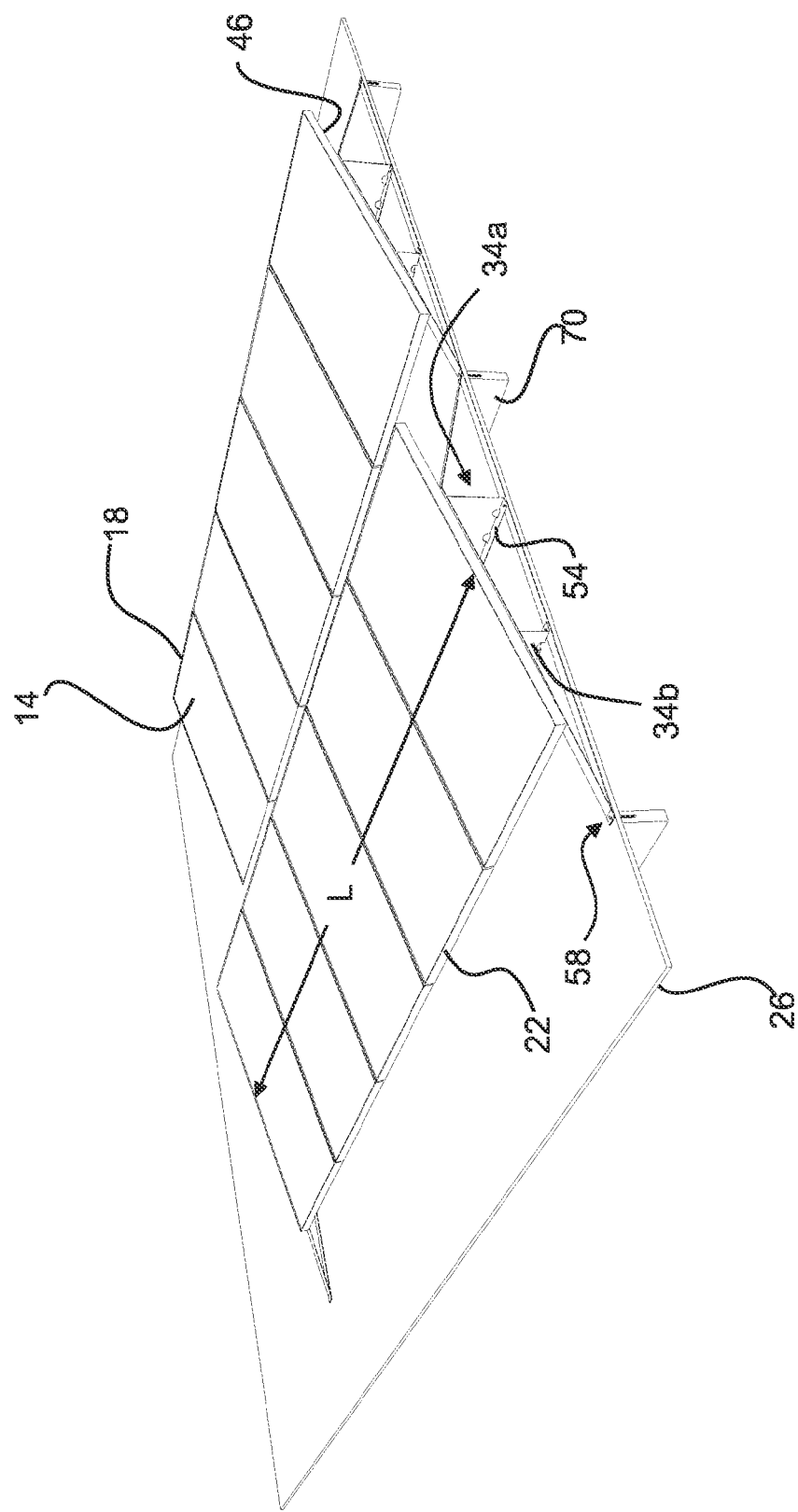
FIG. 8 is a perspective view of this invention installed on a surface for support of a solar panel array from another angle.

Preferably the straps 58a, 58b are a few inches wide W and made of metal. In fact, the straps 58a, 58b could be metal cable. On the other hand the lengths L of the peak and intermediate supports must be at least as long as the width or length of the solar panels, depending on the orientation. In fact they may be multiples of the width or length of the solar panels. FIGS. 7 and 8 illustrate the widths of the straps and the lengths of the supports. The solar panels are preferably attached to the top flanges 42 of the supports 34, 34*a*, 34*b*.

The cross sections of the straps 58 do not have to be rectangular as shown in FIG. 15A. They could alternatively have any cross sectional shape. Some examples are shown in FIGS. 15B-15E.

FIG. 15B illustrates a strap having a C-shaped cross section.

FIG. 15C illustrates a strap having a reverse C-shaped cross section.

FIG. 15D illustrates a strap having a Z-shaped cross section.

FIG. 15E illustrates a strap having an I-shaped cross section.

Moreover, the top surfaces 60 of the straps 58 could be curved rather than flat as illustrated in FIG. 15A. Some examples are shown in FIGS. 16A-16E. FIGS. 16A, 16B, and 16D illustrate concave surfaces 60 while FIGS. 16C and 16E illustrate convex surfaces 60. Other surfaces of the straps 58 could be curved similarly.

Figure 9A:
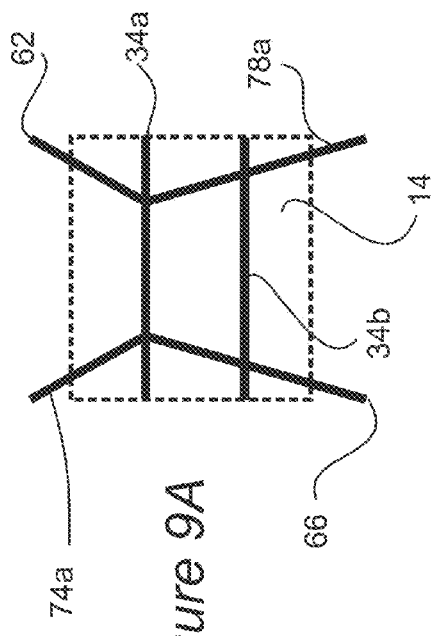
FIG. 9A is a sketch from the top of this invention illustrating one variation in attachment of the top strap.
Figure 9B:
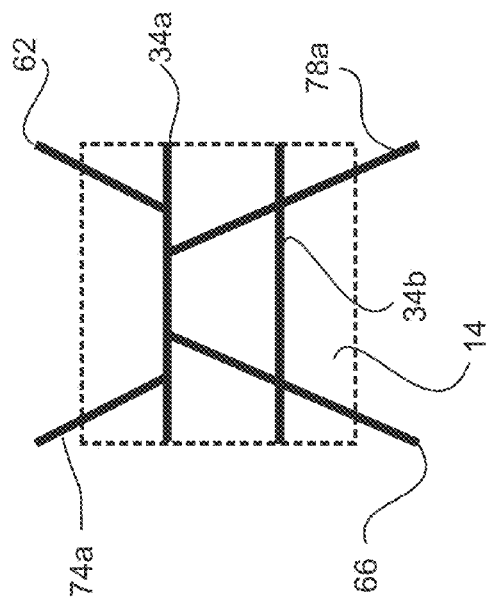
FIG. 9B is a sketch from the top of this invention illustrating another variation in attachment of the top support.
Figure 9E:
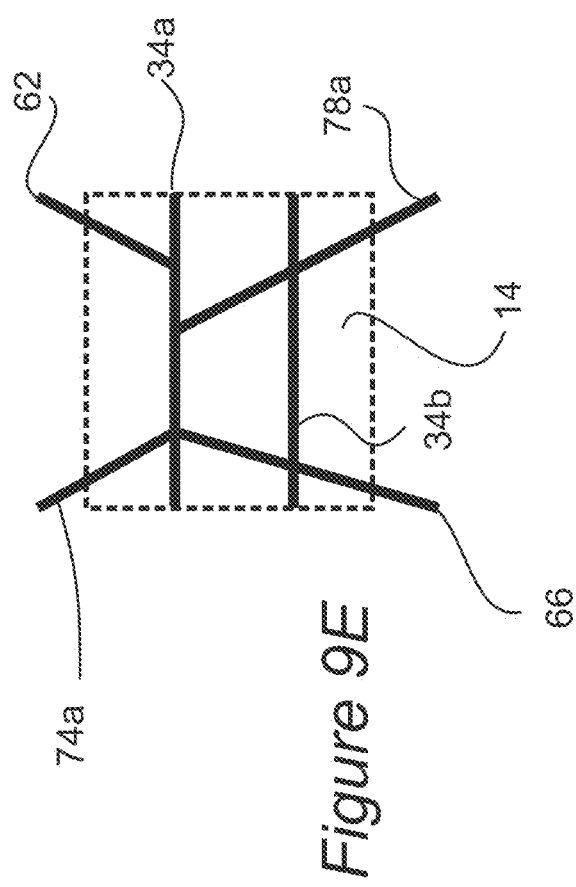
FIG. 9E is a sketch from the top of this invention illustrating yet another variation in attachment of the top support.

There are a multitude of other variations of this invention. FIG. 7 shows the usual case in which the top 58*a* and bottom 58*b* straps run normal to the supports 34*a*, 34*b* at their ends 82*a*, 82*b*. FIGS. 9A-9F are sketches from the top of this invention illustrating variation in attachment of the top straps 58*a*. In all of FIGS. 9A-9D and 9F, the straps 58*a* run at an angle to the supports 34*a*, 34*b*. While particular angles are shown, it will be obvious that there can be considerable variation on the angle. In FIG. 9A the gently pitched 78*a* and steeply pitched 74*a* sections meet at the peak support 34*a* and the angles that the steeply pitched 74*a* and gently pitched 78*a* sections make with the supports 34*a*, 34*b* are supplementary to each other. In FIG. 9B the gently pitched 78*a* and steeply pitched 74*a* sections are separated at the peak support 34*a*. In FIG. 9C the gently pitched sections 78*a* only run to the supplementary support 34*b* and the steeply pitched sections 74*a* only run to the peak support 34*a*. Many other variations of these schemes, including their combinations are possible. For example, see FIG. 9E. Moreover, the straps 58*a*, 58*b* do not have to be straight. They can be curved, trace a zigzag path; trace a sinusoidal path, etc.

In FIG. 9D, the top straps 58*a* are referred to as top straps 64*a*, 64*b*, which are for mounting the solar panel 14, and which cross each other. The first strap 64*a* runs over the first 34*a* and second 34*b* supports from the first point 62 on the surface to the second point 66 on the surface. The second top strap 64*b* runs over the first 34*a* and second 34*b* supports from the third point 100 on the surface to the fourth point 102 on the surface. The first 62, second 66, third 100 and fourth 102 points are arranged in a substantially rectangular configuration. The supports 34*a*, 34*b* are spaced apart and between the first 62 and second 66 points, and third 100 and fourth 102 points.

The ends 68*a*, 68*b* of the first top strap 64*a* are attached to the first 62 and the second 66 points on the surface respectively. The ends 72*a*, 72*b* of the second top strap 64*b* are attached to the third 100 and the fourth 102 points on the surface respectively.

The bottom flanges 54 of the first and second supports 34*a*, 34*b* are attached to the surface. The first 64*a* and second 64*b* top straps are attached to the top flanges 42 of the first 34*a* and second 34*b* supports.

It will be obvious that bottom strap 58*b* can also be used with this embodiment. In this case, as shown in FIG. 9F, the bottom strap 58*b* of this embodiment comprise a first bottom strap 104*a* and a second bottom strap 104*b* that cross at a crossing point 110, and are therefore oriented in the same manner as the crossed top straps 64*a*, 64*b*. In FIG. 9F, the bottom straps 104*a*, 104*b* cannot directly be seen because they lie below the top straps 64*a*, 64*b*, but are labeled to show that the top 64*a*, 64*b* and bottom straps 104*a*, 104*b* are in substantial alignment. The first bottom strap 104*a* runs adjacent the surface from the first point 62 on the surface under the bottom flanges 54 of the first 34*a* and second 34*b* supports and to the second point 66 on the surface. As a result, the first end 106*a* of the first bottom strap 104*a* is between the first end 68*a* of the first top strap 64*a* and the surface and the second end 106*b* is between the second end 68*b* and the surface. The second bottom strap 104*b* runs adjacent the surface from the third point 100 on the surface under the bottom flanges 54 of the first 34*a* and second 34*b* supports and to the fourth point 102 on the surface. As a result, the third end 108*a* of the second bottom strap 104*b* is between the third end 72*a* of the second top strap 64*b* and the surface and the fourth end 108*b* is between the fourth end 72*b* and the surface. The bottom straps 104*a*, 104*b* are attached at the first 68*a*, and second 68*b*, third 72*a* and fourth 72*b* ends of the top straps 64*a*, 64*b* between the ends 68*a*, 68*b*, 72*a*, 72*b* of top straps 64*a*, 64*b* and the surface, using the same attachments as the top straps, as shown in the embodiment of FIG. 1.

Figure 10:
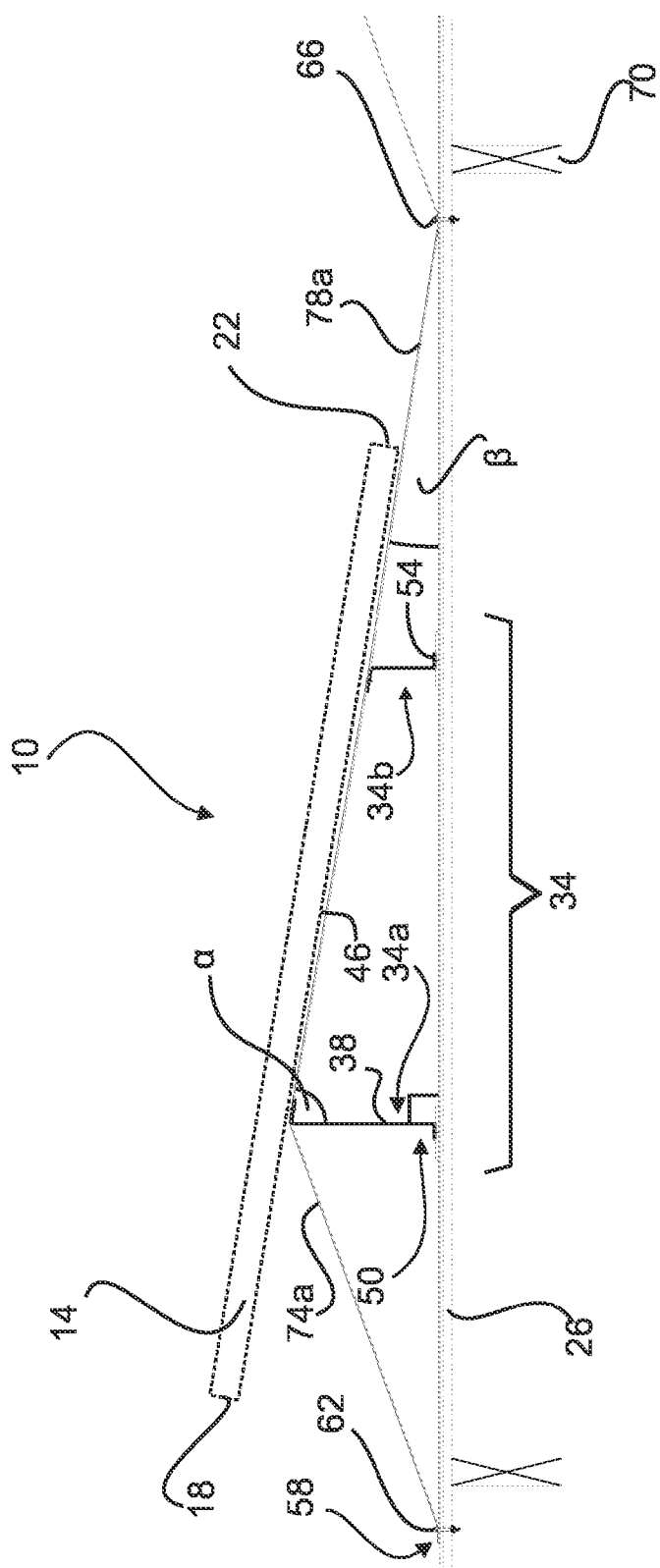
FIG. 10 is a side, cross sectional view of slightly more than one unit of one embodiment of this invention installed on a surface and supporting a solar panel. This embodiment has a top strap and a bottom strap and two supports and is attached to the surface and not to the joists.

FIG. 10 illustrates how this invention 10 can be attached to the surface and not just to the joists 70 or beams. The embodiment illustrated has a top strap 58*a* and a bottom strap 58*b*, a peak support 34*a* and a supplemental support 34*b*. However, this means of surface attachment can be applied to any embodiment or variation of this invention; for example, those shown in FIGS. 5, 6 and 14

Figure 11A:
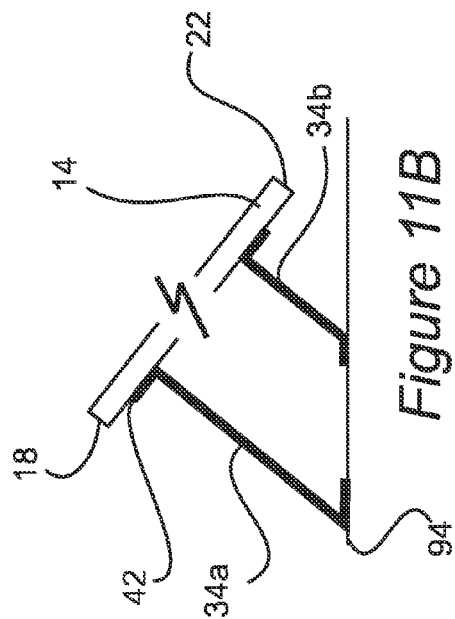
FIG. 11A is a cross sectional sketch illustrating this invention with two vertical supports of equal height. The top flanges point towards the sides of the solar panel.
Figure 11B:
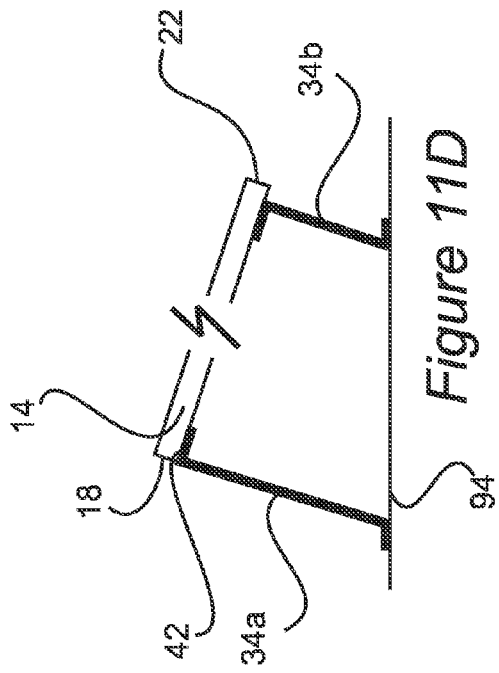
FIG. 11B is a cross sectional sketch illustrating this invention with two supports at the same angle to the vertical yet normal to the solar panel, of different heights. The top flanges point towards the sides of the solar panel.
Figure 11C:
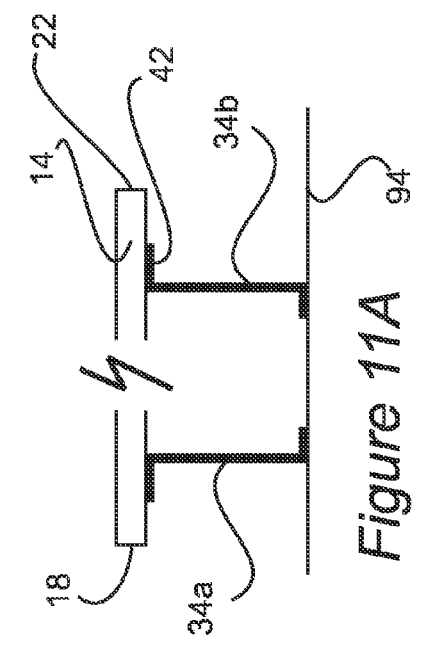
FIG. 11C is a cross sectional sketch illustrating this invention with two supports at different angles to the vertical and to the solar panel, of different heights. The top flanges point towards the sides of the solar panel.
Figure 11D:
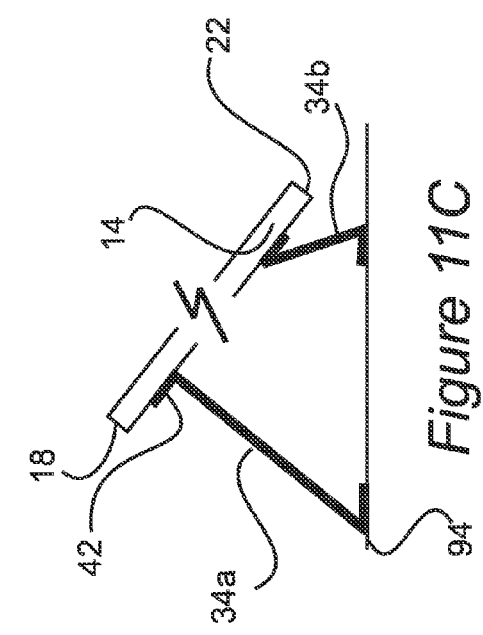
FIG. 11D is a cross sectional sketch illustrating this invention with two supports at the same angle to the vertical yet normal to the solar panel, of different heights. The top flanges point away from the sides of the solar panel.

In the usual case the peak 34*a* and supplemental 34*b* supports are normal to the surface 94 and the peak support 34*a* is taller than the supplemental support 34*b*, as illustrated in FIGS. 1, 5, 6 and 7. But this does not have to be the case. FIGS. 11A-11D illustrate some variations on this theme. FIG. 11A shows the peak 34*a* and supplemental 34*b* supports normal to the surface 94 and of equal height. The top flanges 42 point towards the sides 18, 22 of the solar panel 14. FIG. 11B shows the peak 34*a* and supplemental 34*b* supports at the same angle to the surface 94 yet normal to the solar panel 14, of different heights. The top flanges 42 point towards the sides 18, 22 of the solar panel 14. FIG. 11C shows the peak 34*a* and supplemental 34*b* supports at different angles to the surface 94 and to the solar panel 14, of different heights. The top flanges 42 point towards the sides 18, 22 of the solar panel 14. FIG. 11D shows the peak 34*a* and supplemental 34*b* supports at the same angle to the surface 94 yet normal to the solar panel 14, of different heights. The top flanges 42 point away from the sides 18, 22 of the solar panel 14. Many other variations of these schemes, including their combinations are possible. Moreover, the supports 34*a*, 34*b* do not have to be straight. They can be curved, trace a zigzag path, trace a sinusoidal path, etc.

Figure 12:
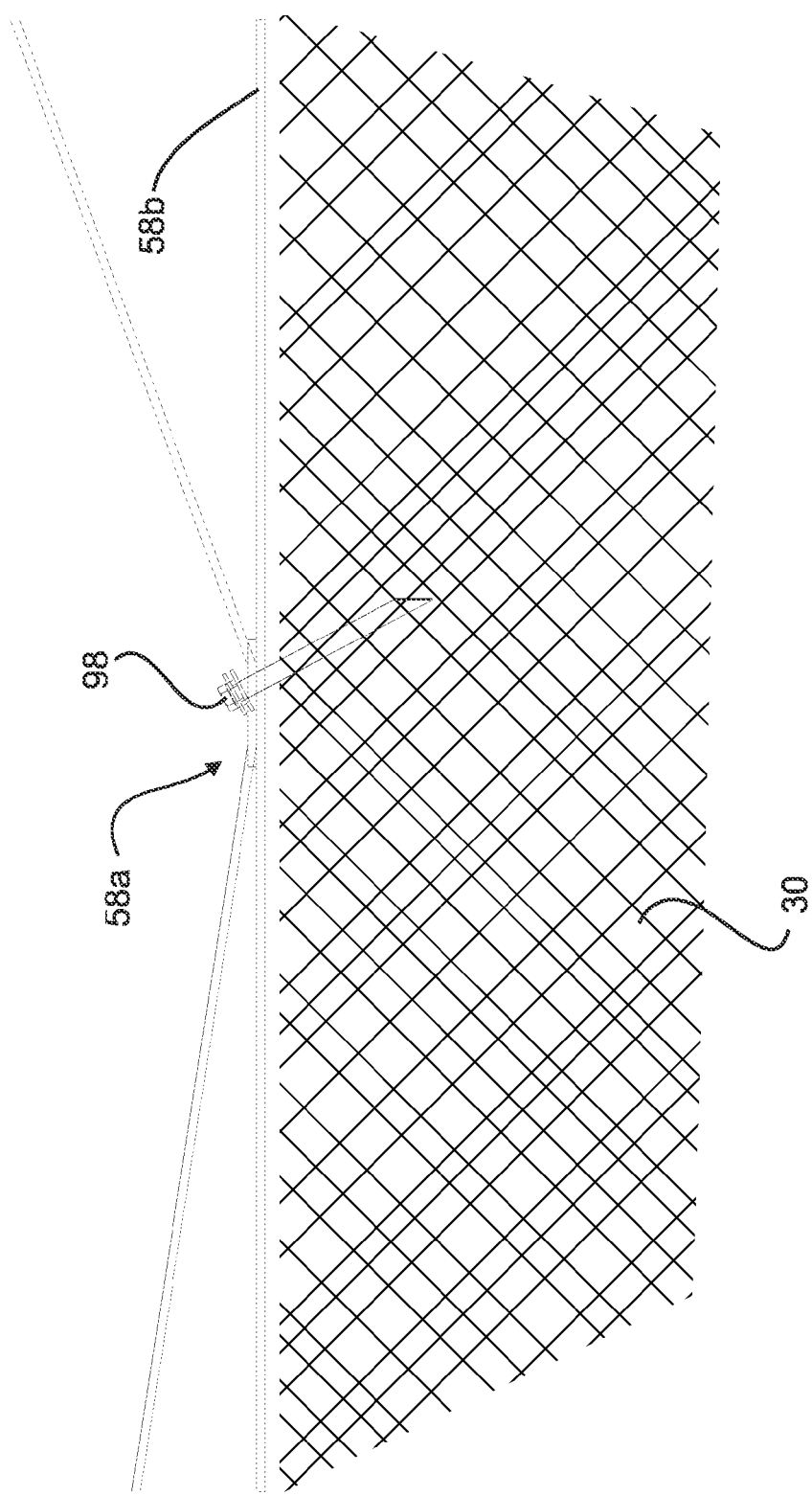
FIG. 12 shows attachment of straps to the ground with a pin or peg.
Figure 13:
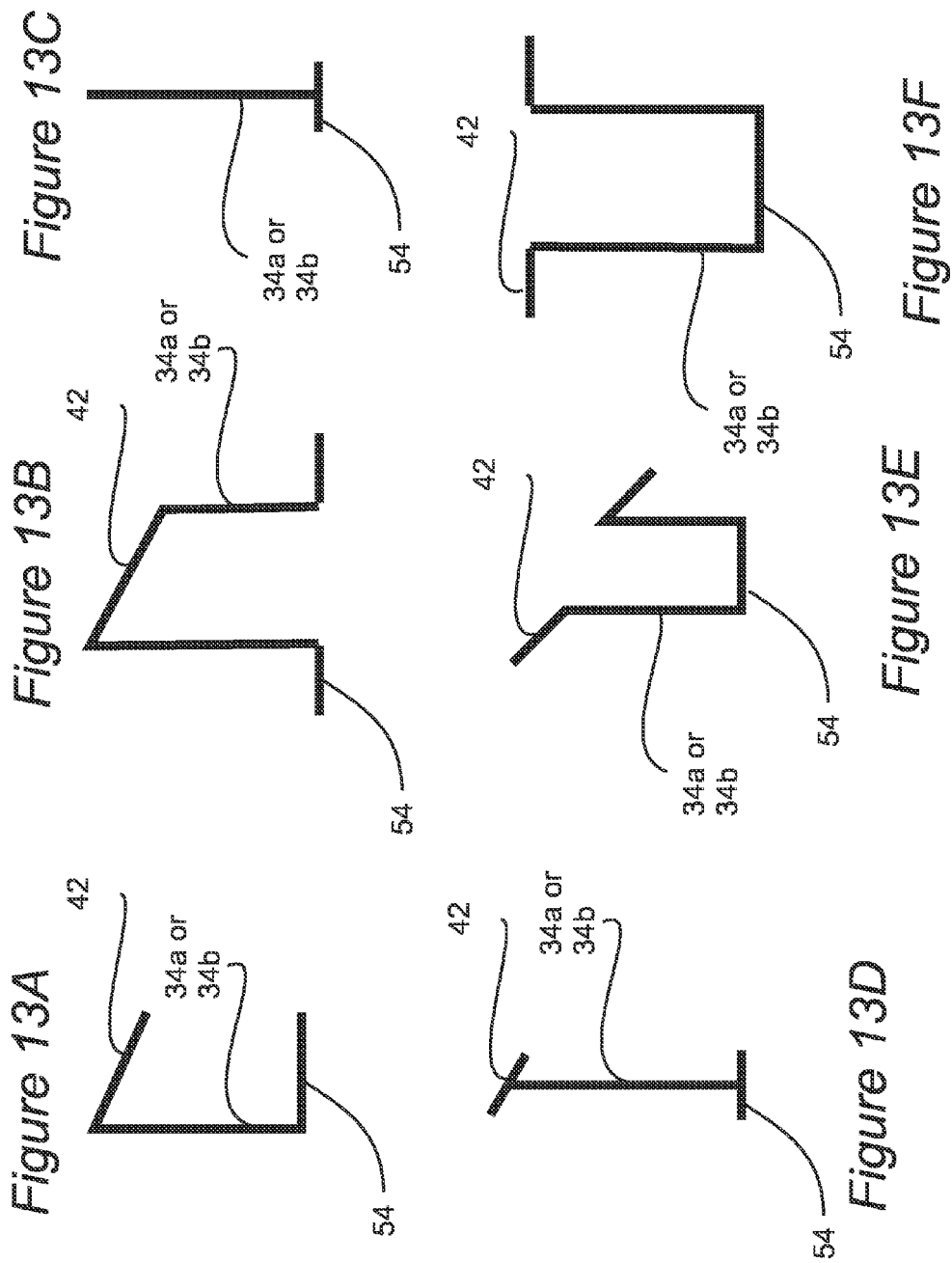
FIGS. 13A-13D illustrate various other shapes that the supports can have.
FIG. 13E illustrates a support with an inverted, angled Π shape.
FIG. 13F illustrates a support with an inverted Π shape.

FIG. 12 shows attachment of straps 58*a*, 58*b* to the ground 30 with a pin or peg 98. The pin 98 is rammed or hammered into the ground 30 and retains the invention 10 in a manner similar to the retention of a tent with a tent peg.

The supports 34*a* or 34*bs* in FIGS. 1-12 are all zig-zag shaped. FIGS. 13A-13D illustrate various other shapes that the supports 34*a* or 34*bs* can have.

FIG. 13A illustrates a support 34a or 34b with a C shape, including an angled top flange.

FIG. 13B illustrates a support 34a or 34b with an angled Π shape.

FIG. 13C illustrates a support 34a or 34b with an inverted T shape.

FIG. 13D illustrates a support 34a or 34b with an I shape and an angled top flange.

FIG. 13E illustrates a support 34a or 34b with an inverted, Π shape with angled top flanges.

FIG. 13F illustrates a support 34a or 34b with an inverted Π shape and parallel top flanges.

Figure 14:
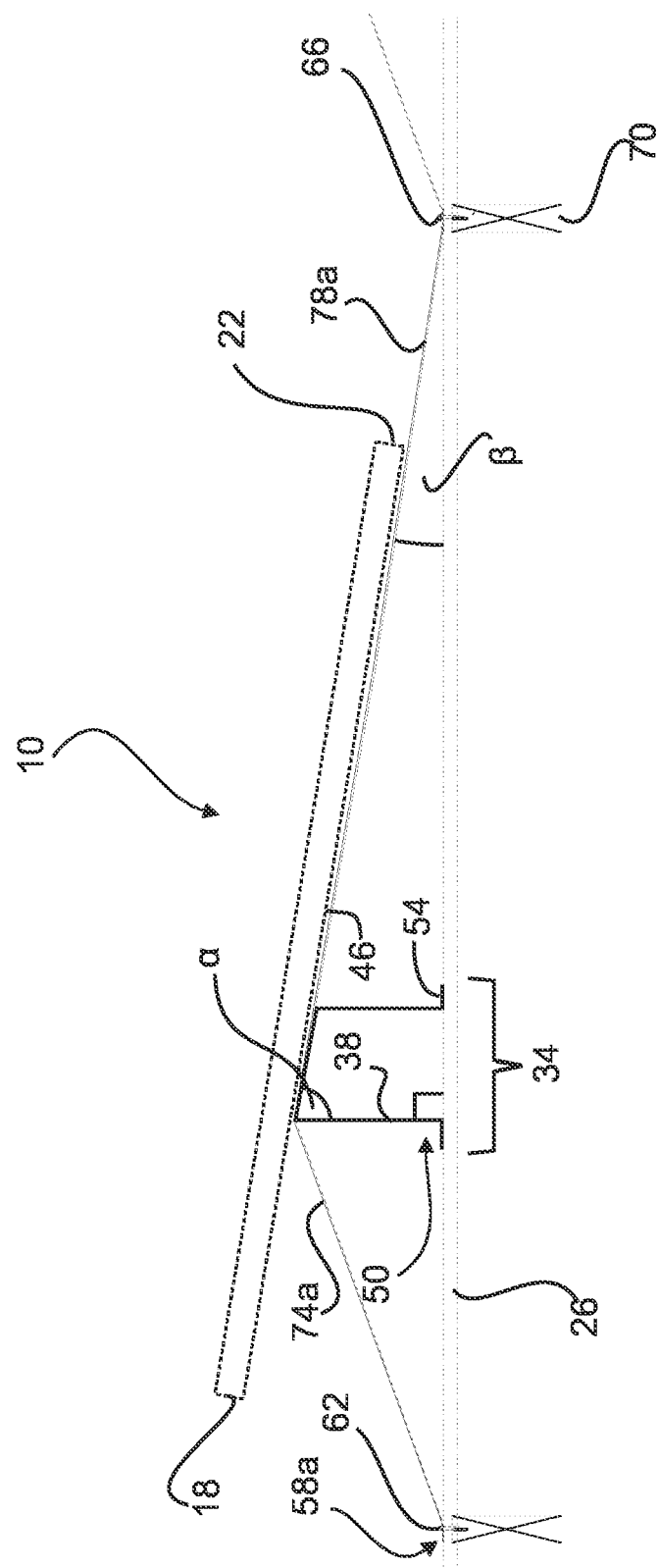
FIG. 14 is a side, cross sectional view of slightly more than one unit of one embodiment of this invention installed on a roof and supporting a solar panel. This embodiment has a top strap, and a single, angled, Π shaped support and is attached to the roof joists.
Figure 17:
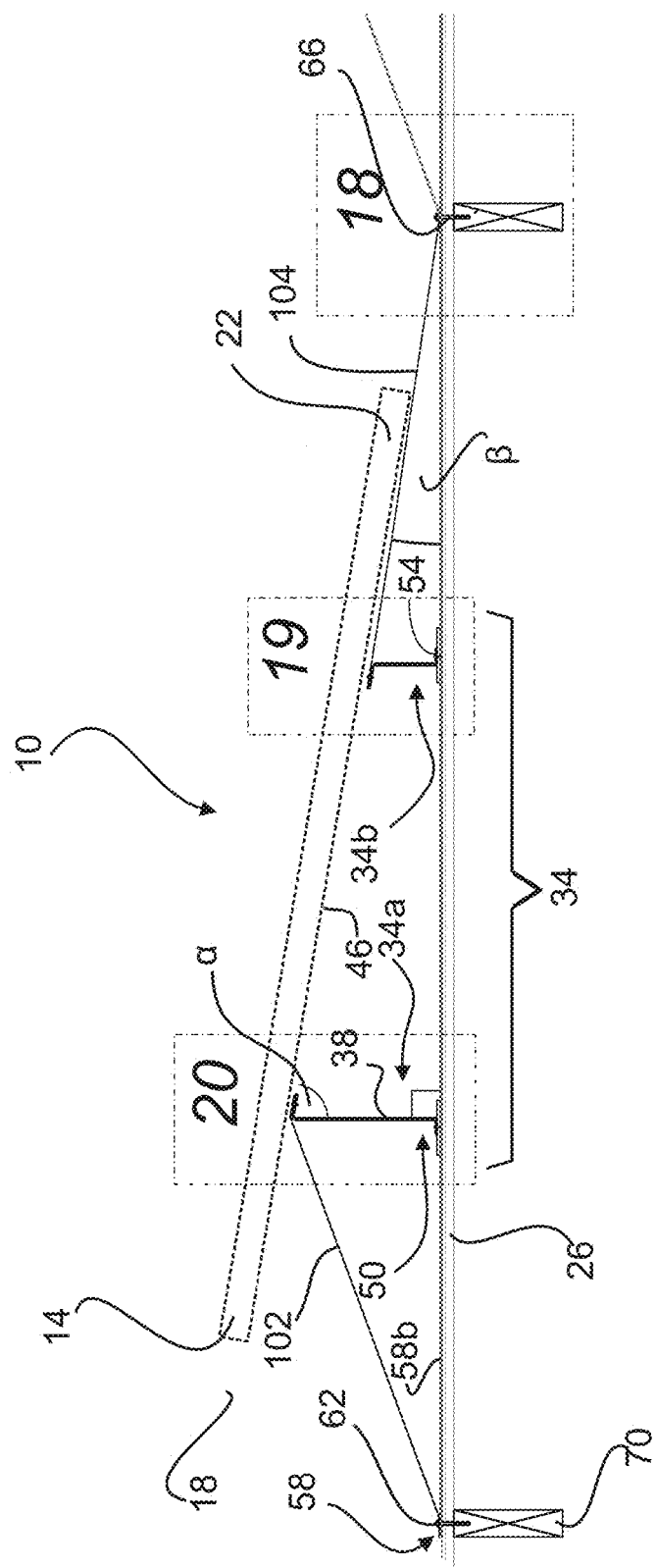
FIG. 17 is a side, cross sectional view of slightly more than one unit of one embodiment of this invention installed on a surface and supporting a solar panel. This embodiment has two side straps, a bottom strap and two supports and is attached to the surface joists.
Figure 18:
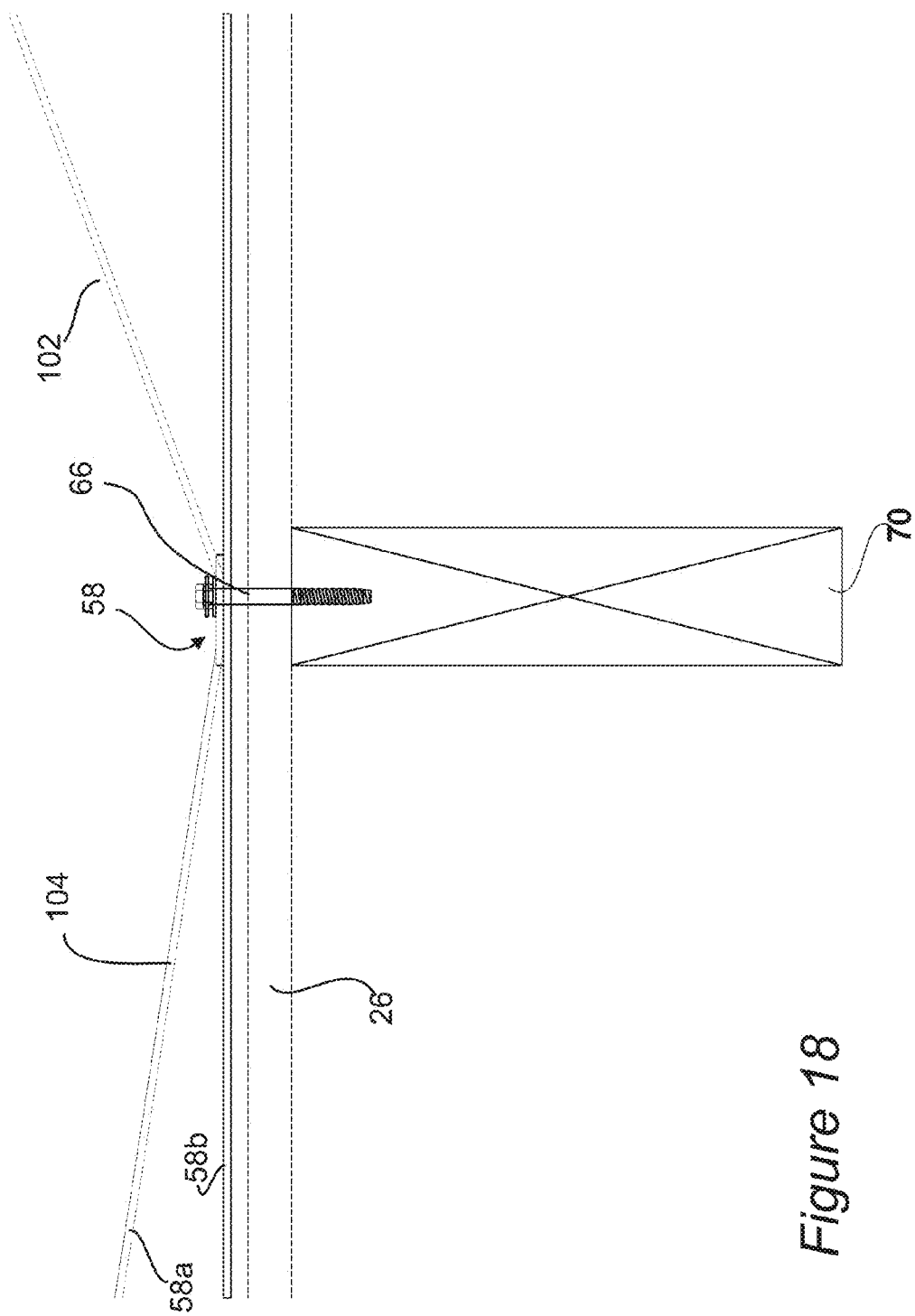
FIG. 18 is an enlarged view of the area marked 18 on FIG. 17.
Figure 19:
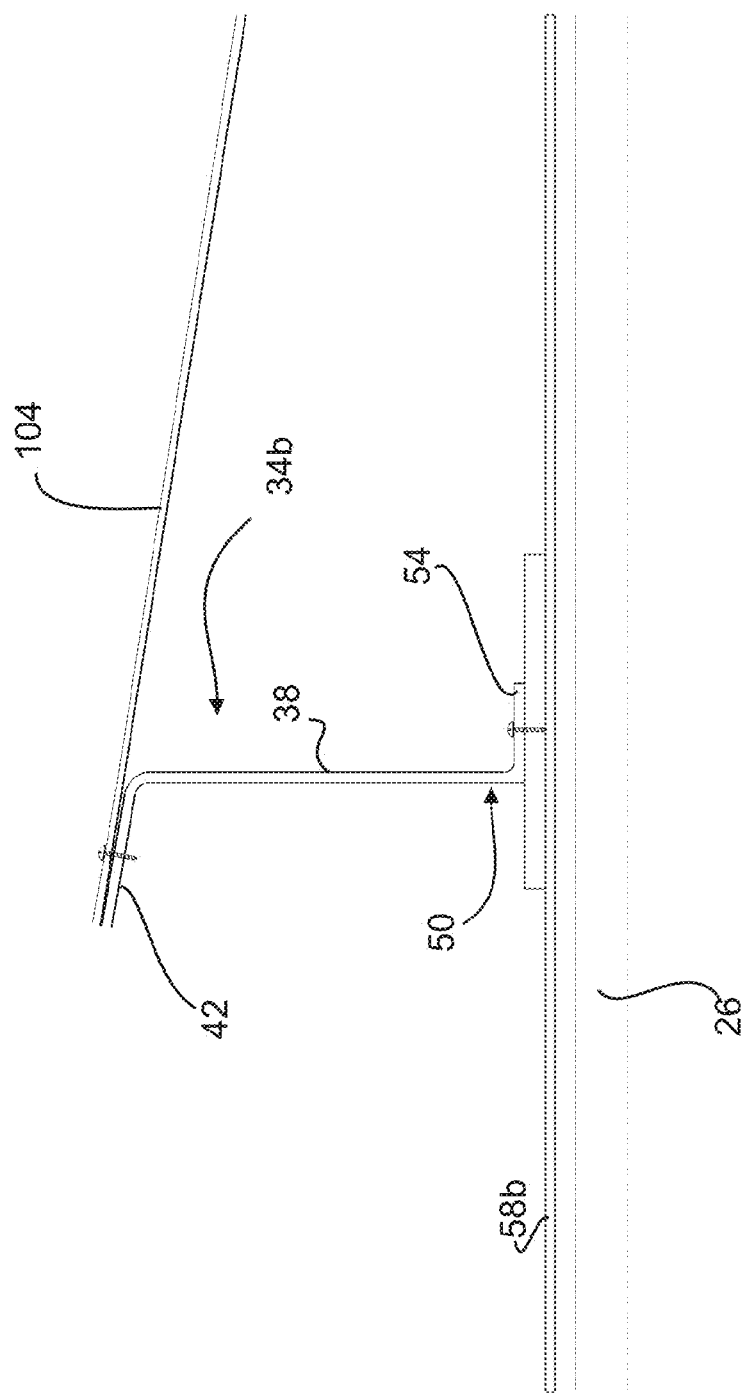
FIG. 19 is an enlarged view of the area marked 19 on FIG. 17.

FIG. 14 is a side, cross sectional view of slightly more than one unit of one embodiment of this invention 10 installed on a roof 26 and supporting a solar panel 14. This embodiment has a top strap 58a, and a single, angled, Π shaped support 34 and is attached to the roof joists 70.

This novel mounting system 10 may be fabricated on site or provided as a kit. First the strap 58 and support 34 are fabricated. Then the strap 58 is attached to the surface 94 between the two points 62, 66 and the support 34 is attached to the strap 58. Finally the solar panel 14 is attached to the top flange 42 of the support 58.

Preferably, there is a peak support 34a and an intermediate support 34b. Preferably there is a top strap 58a and a bottom strap 58b. In this case, the bottom strap 58b is attached to the surface 94 between the two points 62, 66. If the surface is a roof 26 or wall, such attachment is made by screws, bolts, or studs and preferably into underlying joists 70 or beams. If the surface is the ground 30, attachment is made means of driven pins or pegs 98.

Then the supports 34a, 34b are attached to the bottom strap 58b, preferably via their bottom flanges 54. Attachment may be via screw, bolt, stud, adhesive, clamping, welding, etc. In addition, the bottom 50 of each support 34 may be attached to the surface.

Next the top strap 58a is run over the tops of the supports 34a, 34b and attached to their top flanges 42. Attachment is preferably made via screw, bolt, stud, or clamping. Finally, the solar panels are positioned and attached to the top flanges 42. Attachment is preferably made via screw, bolt, stud, or clamping.

There are at least 48 variations of this invention 10. The support can be singular 34 or in two parts 34a, 34b. The strap can be at the top 58a, at the bottom 58b or both. The top strap 58a can be normal to the supports 34a, 34b or at an angle to them. The top strap 58a can be continuous and or in two separate parts. In addition there are many possible patterns for attaching the bottom strap 58b between the two points 62, 66.

The following reference numerals are used on FIGS. 1 through 14:

10 novel solar mounting system of this invention
14 solar panel
18 upper side of solar panel
22 lower side of solar panel
26 roof
30 ground
34 support
34a peak support
34b intermediate support
38 central member of support
42 top flange of support
46 bottom of solar panel
50 bottom of support
54 bottom flange of support
58 strap
58a top strap
58b bottom strap
60 top surface of strap
62 first point on surface
64a first top strap
64b second top strap
66 second point on surface
68a first end of first top strap
68b second end of first top strap
70 joist or beam
72a third end of second top strap
72b fourth end of second top strap
74 steeply pitched section of strap
74a steeply pitched section of top strap
76 weep hole
78 gently pitched section of strap
78a gently pitched section of top strap
80 crossing point
82a one end of support
82b other end of support
86 one end of solar panel
90 other end of solar panel
94 surface
98 pin or peg
100 third point on surface
102 fourth point on surface
104a first bottom strap
104b second bottom strap
106a first end of first bottom strap
106b second end of first bottom strap
108a third end of second bottom strap
108b fourth end of second bottom strap
110 crossing point of bottom straps
α angle between the top flange and the central member
β angle between the surface and the bottom of the solar panel
W width of strap
L length of support Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for mounting a solar panel on a surface comprising:
   a) a first top strap having a first end and a second end;
   b) a second top strap having a third end and a fourth end;
   c) said straps crossing each other at a point intermediate said first and second ends, and said third and fourth ends;
   d) a first attachment attaching said first end to a first point on said surface;
   e) a second attachment attaching said second end to a second point on said surface;
   f) a third attachment attaching said third end to a third point on said surface;
   g) a fourth attachment attaching said fourth end to a fourth point on said surface; said first, second, third and fourth points spaced apart;
   h) a first support having a first top flange and a first bottom flange, said first bottom flange attached to said surface; and i) a second support having a second top flange and a second bottom flange; said second bottom flange attached to said surface; said supports being spaced apart and between said first and second points, and third and fourth points;

j) said first top strap attached to said first top flange and said second top flange;

k) said second top strap attached to said first top flange and said second top flange; said first and second top straps for mounting said solar panel.

2. An apparatus as claimed in claim 1 in which said top flanges are parallel to said surface.

3. An apparatus as claimed in claim 1 in which said top flanges are at an angle to said surface.

4. An apparatus as claimed in claim 1 in which one or more of said first and second top straps has a cross section which is rectangular.

5. An apparatus as claimed in claim 1 in which one or both of said supports has a cross section which is a zig-zag shape.

6. An apparatus as claimed in claim 1 in which said supports have lengths which are greater than widths of said straps.

7. An apparatus as claimed in claim 1 further comprising:

a) a first bottom strap having a first end and a second end; and b) a second bottom strap having a third end and a fourth end; said bottom straps crossing each other at a point intermediate said first and second ends, and said third and fourth ends of the bottom straps;

said first end of the first bottom strap being between said first end of said first top strap and said surface and attached by said first attachment to said first point on said surface;

said second end of the first bottom strap being between said second end of said first top strap and said surface and attached by said second attachment to said second point on said surface;

said third end of the second bottom strap being between said third end of said second top strap and said surface and attached by said third attachment to said third point on said surface;

said fourth end of the second bottom strap being between said fourth end of said second top strap and said surface and attached by said fourth attachment to said fourth point on said surface.

8. A method for mounting a solar panel on a surface comprising the steps of:

a) providing a first top strap having a first end and a second end;

b) providing a second top strap having a third end and a fourth end;

c) providing a first support having a first top flange and a first bottom flange;

d) providing a second support having a second top flange and a second bottom flange;

e) attaching said first bottom flange to said surface and attaching said second bottom flange to said surface so that said supports are spaced apart;

g) attaching said first end to a first point on said surface, attaching said second end to a second point on said surface, attaching said third end to a third point on said surface and attaching said fourth end to a fourth point on said surface so that said top straps cross each other at a point intermediate said first and second ends, and said third and fourth ends and said supports are between said first and second points, and said third and fourth points;

l) attaching said first top strap to said first top flange and said second top flange;

m) attaching said second top strap to said first top flange and said second top flange; said first and second top straps for mounting said solar panel.

9. A method as claimed in claim 8 further comprising:

a) providing a first bottom strap having a first end and a second end;

b) providing a second bottom strap having a third end and a fourth end;

c) attaching said first end of the first bottom strap by said first attachment between said first end of said first top strap and said surface to said first point on said surface;

d) attaching said second end of the first bottom strap by said second attachment between said second end of said first top strap and said surface to said second point on said surface;

e) attaching said third end of the second bottom strap by said third attachment between said third end of said second top strap and said surface to said third point on said surface;

f) attaching said fourth end of the second bottom strap by said fourth attachment between said fourth end of said second top strap and said surface to said fourth point on said surface;

so that said bottom straps cross each other at a point intermediate said first and second ends, and said third and fourth ends of the bottom straps.

10. A method as claimed in claim 8 in which said top flanges are parallel to said surface.

11. A method as claimed in claim 8 in which said top flanges are at an angle to said surface.

12. A method as claimed in claim 8 in which one or more of said first and second top straps has a cross section which is rectangular.

13. A method as claimed in claim 8 in which one or both of said supports has a cross section which is a zig-zag shape.

14. A method as claimed in claim 8 in which said supports have lengths which are greater than widths of said straps.

* * * * *